United States Patent
Melton et al.

(10) Patent No.: US 7,017,877 B2
(45) Date of Patent: Mar. 28, 2006

(54) SUPPORT ASSEMBLY

(75) Inventors: Loyd Melton, Phoenix, AZ (US); Jack C. Reabold, Chandler, AZ (US)

(73) Assignee: Swivel Hooks International, LLC, Chandler, AZ (US)

( * ) Notice: Subject to any disclaimer, the term of this patent is extended or adjusted under 35 U.S.C. 154(b) by 0 days.

(21) Appl. No.: 10/936,117

(22) Filed: Sep. 7, 2004

(65) Prior Publication Data

US 2005/0067544 A1    Mar. 31, 2005

Related U.S. Application Data

(60) Provisional application No. 60/506,234, filed on Sep. 25, 2003.

(51) Int. Cl.
*F16B 45/00* (2006.01)

(52) U.S. Cl. ..................... 248/304; 248/914

(58) Field of Classification Search ............... 248/304, 248/339, 288.31, 290.1, 288.51, 324, 505, 248/276.1, 914
See application file for complete search history.

(56) References Cited

U.S. PATENT DOCUMENTS

| | | | |
|---|---|---|---|
| 309,621 A | 12/1884 | Herrick et al. | |
| 873,129 A * | 12/1907 | Humphries | 248/235 |
| 1,701,683 A * | 2/1929 | Leas | 248/341 |
| 1,713,835 A | 5/1929 | Krieg | |
| 2,452,120 A | 10/1948 | Gorne | |
| 2,452,778 A | 11/1948 | Mathewson | |
| 2,484,173 A | 10/1949 | Leas | |
| 2,532,255 A | 11/1950 | Davis | |
| 2,547,124 A | 4/1951 | Hudson et al. | |
| 2,882,005 A | 4/1959 | Ramsing | |
| 2,901,552 A * | 8/1959 | Geloso | 381/363 |
| 3,321,166 A | 5/1967 | Gordon | |
| 3,913,876 A * | 10/1975 | McSherry | 248/74.3 |
| 4,037,229 A * | 7/1977 | Dunk | 343/715 |
| D249,226 S | 9/1978 | Hills et al. | |
| 4,174,087 A | 11/1979 | Gaines | |
| 5,094,417 A | 3/1992 | Creed | |
| 5,128,841 A * | 7/1992 | Maglica et al. | 362/191 |
| 2002/0166935 A1 * | 11/2002 | Carnevali | 248/276.1 |
| 2003/0038220 A1 | 2/2003 | Catan | |

* cited by examiner

Primary Examiner—Ramon O Ramirez
(74) Attorney, Agent, or Firm—Schmeiser, Olsen & Watts LLP

(57) ABSTRACT

A support assembly, method, and kit for holding items are described. A support assembly may include a mounting base and a support removably coupled to the mounting base. The mounting base may include a socket having a circumferentially undulating edge at least partially forming an internal head cavity. The mounting base may further include a through hole extending through the mounting base and the socket, the through hole in communication with the head cavity. A kit may include at least one mounting base as described and a plurality of interchangeable supports.

30 Claims, 7 Drawing Sheets

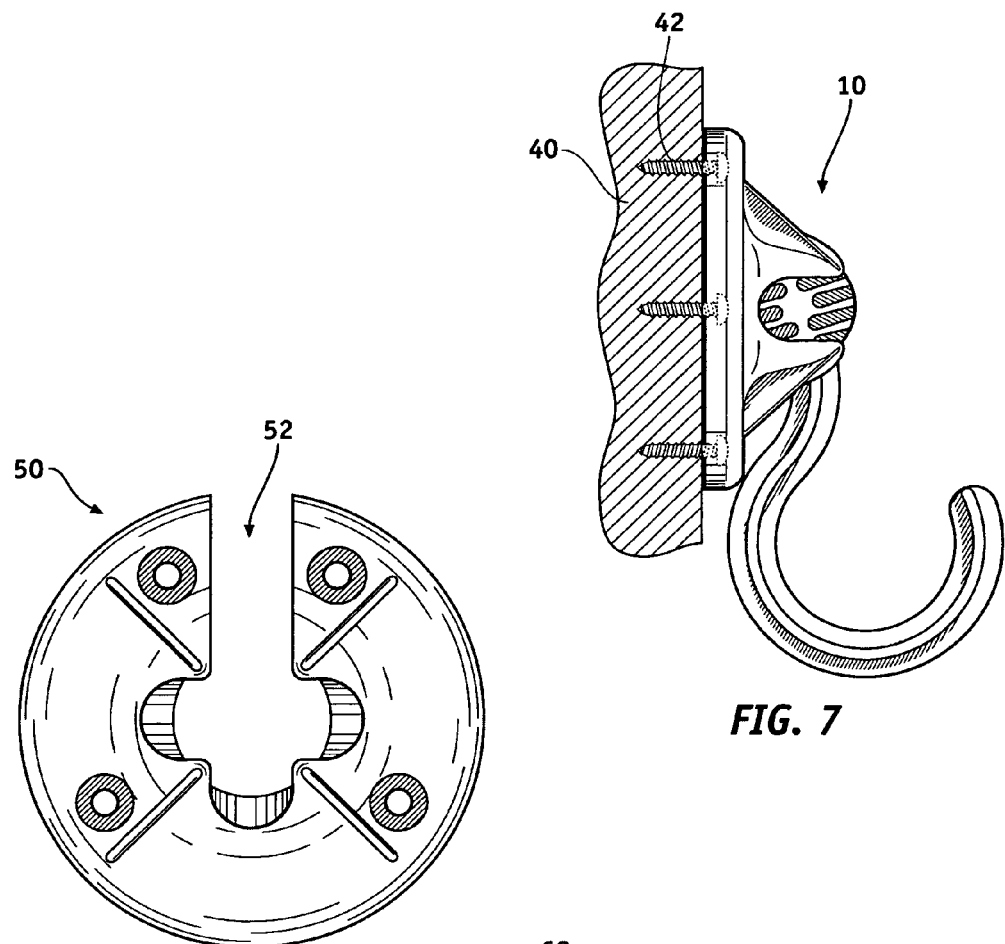
FIG. 7
FIG. 8
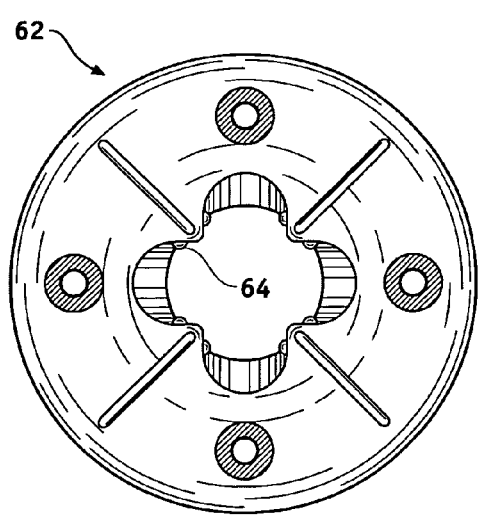
FIG. 9

SUPPORT ASSEMBLY

CROSS REFERENCE TO RELATED APPLICATION

This application claims priority to U.S. Provisional Patent Application to Loyd Melton and Jack C. Reabold entitled "TABLE HOOK W/SWIVEL FOR HANDBAGS, PURSES & THE LIKE," Ser. No. 60/506,234, filed Sep. 25, 2003, the disclosure of which is hereby incorporated entirely herein by reference.

BACKGROUND

1. Technical Field

This document relates to a support assembly.

2. Background Art

Conventional hanger devices are available that mount on structures and suspend items out of the way in a convenient place. However, these devices do not readily permit universal movement of their hangers. While some of these devices allow a swiveling (spinning) movement of their hangers, they do not also allow pivoting and swinging movements of their hangers from side to side to any position in the range of 0° to about 180°.

SUMMARY

In an aspect, this document features a support assembly and method for holding items. The support assembly may include a mounting base and a support removably coupled to the mounting base. The mounting base may include a socket having a circumferentially undulating edge at least partially forming an internal head cavity. The mounting base may further include a through hole extending through the mounting base and the socket, the through hole in communication with the head cavity.

Implementations may include one or more of the following. The socket may include at least two socket members at least partially forming an internal head cavity. The through hole may include at least two shank notches between and separating the at least two socket members. The mounting base may include at least one fastener through hole disposed adjacent the socket. The mounting base may further include a lateral through gap extending between an outside edge of the mounting base and the internal head cavity of the socket. The at least two socket members may be curved inwardly at least partially forming a partially spherical internal head cavity. Each of the at least two socket members may include a bump on each side of the socket member protruding into an adjacent shank notch. The mounting base may further include at least two braces coupled between external surfaces of the at least two socket members and the mounting base. The support may include: a head removably pivotably supported in the head cavity; a shank coupled to the head and moveable into the at least two shank notches; and at least one holder coupled to the shank. The at least one holder may be one of at least one loop, at least one hook, and a combination thereof. The at least one hook or loop may be one of a single hook or loop, a single angled hook or loop, a double hook or loop, a treble hook or loop, and an inline series of hooks or loops. The at least one holder may include a brace coupled on a back thereof for keeping the at least one holder orthogonal to a mounting surface when the support assembly is installed thereon. The shank and the head may be removably coupled together. For example, a free end of the shank may include an aligning through hole. The head may include a shank-receiving hole therein and a pair of aligning through holes there through orthogonal to and in communication with the shank-receiving hole, the pair of aligning through holes corresponding to the aligning through hole in the free end of the shank. A removable fastener may be passed through the aligning through holes to removably couple the free end of the shank within the shank-receiving hole. The head may include a plurality of recesses therein, and the shank and the at least one holder each may form a cross-shape in cross section.

In another aspect, this document features a kit for holding items. The kit may include at least one mounting base as described previously and a plurality of interchangeable supports as described previously for removably coupling to the at least one mounting base.

These general and specific aspects may be implemented using a system, a method, and/or a computer program, or any combination of systems, methods, and/or computer programs. Additionally, the foregoing and other aspects, features, and advantages will be apparent from the DESCRIPTION and DRAWINGS, and from the CLAIMS.

BRIEF DESCRIPTION OF THE DRAWINGS

Implementations will hereinafter be described in conjunction with the appended DRAWINGS, where like designations denote like elements, and:

FIGS. 6–7 are side views of the support assembly of FIG. 1 during its assembly and installation respectively;

FIG. 8 is a front view of a mounting base of an alternative support assembly implementation;

FIGS. 9–10 are front and perspective views of an alternative support assembly implementation;

DESCRIPTION

1. Structure

Although there are a variety of support assembly implementations for holding items, with reference to FIGS. 1–7 and for the exemplary purposes of this disclosure, support assembly 10 is an example of a support assembly implementation. Support assembly 10 may include mounting base 12 and support 30.

Figure 1:
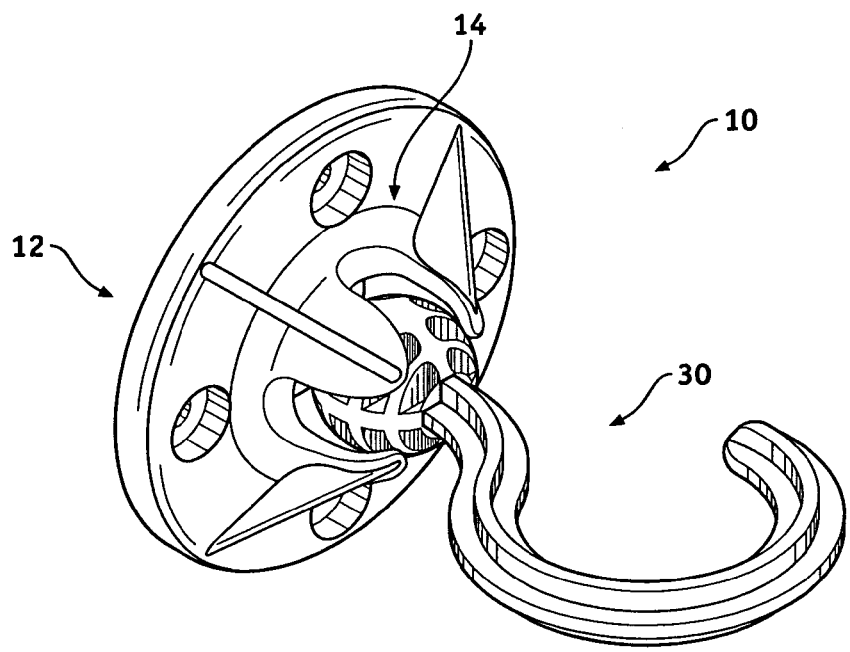
FIG. 1 is a perspective view of a support assembly implementation.
Figure 2:
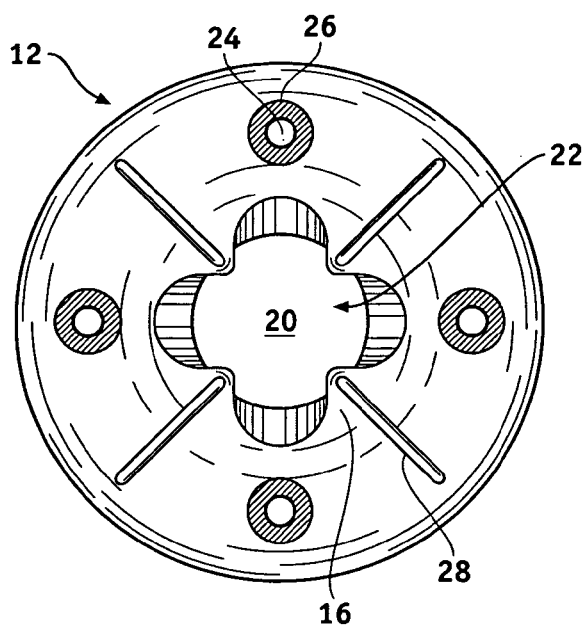
FIG. 2 is a front view of a mounting base of the support assembly of FIG. 1.
Figure 5:
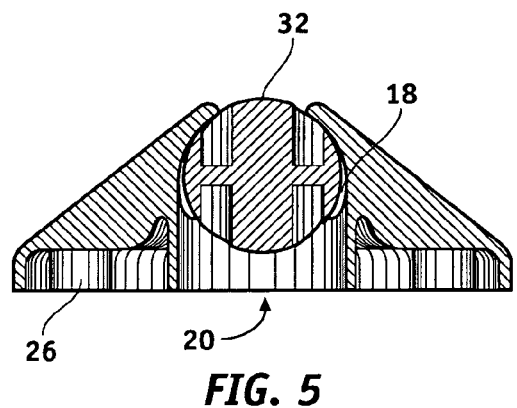
FIG. 5 a cross-sectional view of the support assembly of FIG. 1 taken along line 5—5 of FIG. 4.

Referring to FIGS. 1–2 and 5, mounting base 12 may include a base portion, socket 14, socket members 16, internal head cavity 18, main through hole 20, shank notches 22, fastener through holes 24, squat sleeves 26, and braces 28. The base portion may be of simple shape, being in the outline of a circular disc with a rounded upper edge. The bottom surface of the base portion presents an effectively flat surface which may be installed against a surface of a structure. The base portion may also include a hollow interior.

Socket 14 may protrude from the top surface of the base portion and may include four, upwardly extending, inwardly curved socket members 16 each having a free end. Socket members 16 may be disposed in a symmetrical fashion adjacent main through hole 20. Socket members 16 may at least partially form partially spherical internal head cavity 18. Braces 28 may be coupled between external surfaces of socket members 16 and the base portion. Braces 28 support socket members 16 and maintain the integrity of socket 14 so that under a load head 32 cannot be pulled through internal head cavity 18 and out of socket 14.

Main through hole 20 may be a central through opening reinforced by a squat sleeve below internal head cavity 18 and concealed within the hollow interior of the base portion. Through hole 20 may extend coaxially through the base portion and socket 14. Through hole 20 may be in communication with head cavity 18. Through hole 20 may include four, substantially U-shaped, shank notches 22 disposed in a symmetrical fashion between and separating socket members 16.

Fastener through holes 24 may be recessed in the base portion and disposed in a symmetrical fashion adjacent socket 14, between socket 14 and the periphery of the base portion. Corresponding squat sleeves 26, concealed within the hollow interior of the base portion, reinforce fastener through holes 24.

Figure 3:
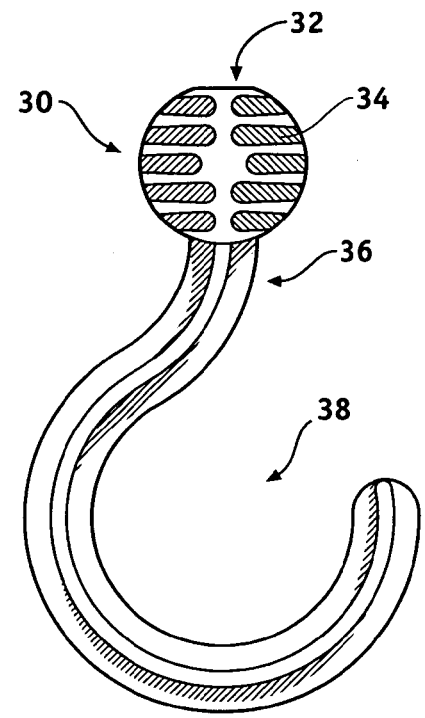
FIG. 3 is a side view of a support of the support assembly of FIG. 1.

Referring to FIGS. 1, 3, and 5, support 30 may include head 32, shank 36, and holder 38. Head 32 may be ball-shaped and may include a plurality of recesses 34 therein. Head 32 may be removably pivotably supported in head cavity 18 and is large enough so that it cannot be pulled through internal head cavity 18 and out of socket 14. Accordingly, head 32 and socket 14 form a removable, pivotal coupling.

Shank 36 may be coupled to head 32 and may be moveable into shank notches 22. Holder 38, here shown in the shape of a hook, may be coupled to shank 36. Shank 36 and holder 38 each may form a cross-shape in cross section.

Recesses 34 in head 32 and the cross-shape of shank 36 and holder 38 lowers the weight of support 30 (thereby reducing its cost), allows support 30 to cool faster during manufacture (thereby reducing its cost), helps support 30 retain its overall shape and not warp during manufacture, and increases the strength of support 30.

Figure 4:
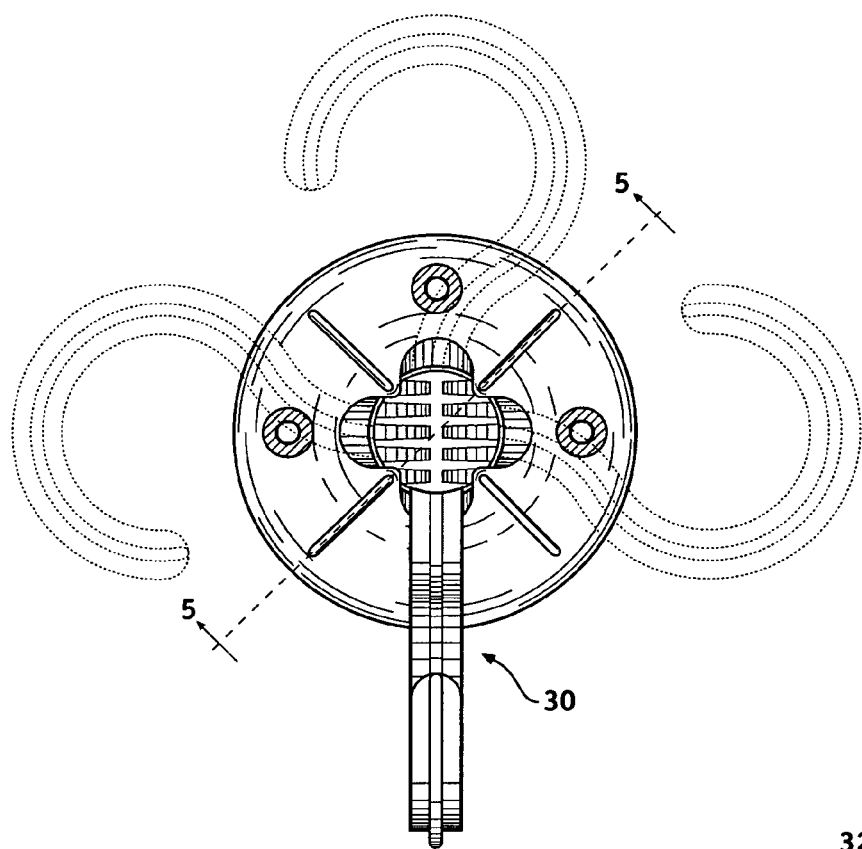
FIG. 4 is a front view of the support assembly of FIG. 1.

Thus, as partially depicted in FIG. 4 and inherent from the disclosure herein, the removable, pivotal coupling between head 32 and socket 14 allows for a universal joint between mounting base 12 and support 30. That is, support 30 is free to not only swivel, but because of notches 22, support 30 is also free to pivot and move sidewise as well to any position in the range of about 0° (so that shank 36 rests in notch 22 approximately parallel with the base portion of mounting base 12) to about 180° (so that shank 36 rests in a diametrically opposing notch 22 approximately parallel with the base portion of mounting base 12).

2. Specifications, Materials, Manufacture, Assembly and Installation

It will be understood that support assembly implementations are not limited to the specific components disclosed herein, as virtually any components consistent with the intended operation of a support assembly implementation may be utilized. Accordingly, for example, although particular mounting bases, sockets, socket members, internal head cavities, main through holes, shank notches, fastener through holes, squat sleeves, braces, through gaps, bumps, supports, heads, recesses, shanks, holders, fasteners, and other components are disclosed, such components may include any shape, size, style, type, model, version, measurement, concentration, material, quantity, and/or the like consistent with the intended operation of a support assembly implementation. Support assembly implementations are also not limited to uses of any specific components, provided that the components selected are consistent with the intended operation of a support assembly implementation.

Accordingly, the components defining any support assembly implementation may be formed of any of many different types of materials or combinations thereof that can readily be formed into shaped objects provided that the components selected are consistent with the intended operation of a support assembly implementation. For example, the components may be formed of: rubbers (synthetic and/or natural); polymers such as plastic, polycarbonate, PVC, ABS, polystyrene, polypropylene, nylon, any combination thereof, and/or other like materials; reinforcements such as fiberglass, carbon-fiber, aramid-fiber, and/or other like materials; metals such as zinc, magnesium, titanium, copper, iron, steel, stainless steel, any combination thereof, and/or other like materials; alloys such as aluminum, and/or other like materials; any other suitable material; and/or any combination thereof.

Furthermore, the components defining any support assembly implementation may be purchased pre-manufactured or manufactured separately and then assembled together. However, any or all of the components may be manufactured simultaneously and integrally joined with one another. Manufacture of these components separately or simultaneously may involve extrusion, pultrusion, vacuum forming, injection molding, blow molding, resin transfer molding, casting, milling, stamping, cutting, welding, soldering, riveting, punching, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components. Other possible steps might include sand blasting, polishing, powder coating, and/or painting the components for example.

Accordingly, for the exemplary purposes of this disclosure, supports and mounting bases of particular support assembly implementations each may be formed as a single piece composed of several united components, thereby permitting each component to be made with high speed, low cost, rapid, mass production equipment. Furthermore, for the exemplary purposes of this disclosure, supports and mounting bases of particular support assembly implementations each may be formed of an ABS-fiberglass combination.

Figure 6:
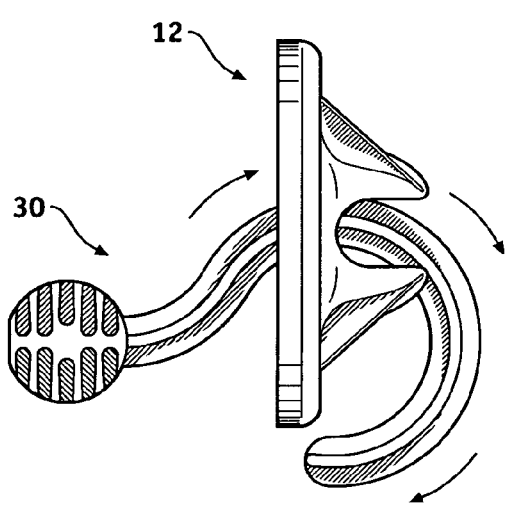

Referring now to FIGS. 6–7 and for the exemplary purposes of this disclosure, support assembly 10 may be assembled as depicted. Accordingly, support 30 may be removably coupled with mounting base 12. This may be accomplished by inserting holder 38 through main through hole 20, as indicated by the arrows in FIG. 6, until head 32 is removably pivotably supported in head cavity 18. While the assembly of support assembly 10 has been described in a particular sequence of steps, it will be understood that the assembly of other support assembly implementations are not limited to the specific order of steps as disclosed since various assembly processes and sequences of steps may be used to assemble other support assembly implementations.

To use a support assembly implementation, it first is necessary to install it on a structure. Referring now to FIG. 7 and for the exemplary purposes of this disclosure, support assembly 10 may be installed as depicted. Accordingly, once support assembly 10 is assembled as described previously, mounting base 12 may be placed in a suitable location on a ceiling, wall, floor, beam, other structure, or the like. For the exemplary purposes of this disclosure, mounting base 12 may be placed in a suitable location on wall 40. Then an installer may insert screws 42 through holes 24. Finally, using a screwdriver for example, the installer may turn screws 42 home so that their shanks are extended through squat sleeves 26 and the heads of screws 42 bear against the tops of squat sleeves 26 to force the base portion of mounting base 12 against wall 40. Again, while the installation of support assembly 10 has been described in a particular sequence of steps, it will be understood that the installation of other support assembly implementations are not limited to the specific order of steps as disclosed since various installation processes and sequences of steps may be used to install other support assembly implementations.

3. Other Implementations

Many additional implementations are possible.

For the exemplary purposes of this disclosure, although there are a variety of mounting base implementations for support assemblies, for the exemplary purposes of this disclosure, mounting bases substantially similar to mounting base 12 as previously described may be provided. The principle difference between them is the number of socket members and shank notches. While mounting base 12 has four socket members and four shank notches, these alternative mounting bases may have two or three socket members and two or three shank notches respectively depending upon such considerations as versatility desired, application environment, load requirements, and the like for example. The two or three socket members, as well as the two or three shank notches, may be disposed in a symmetrical fashion adjacent the main through hole.

Figure 10:
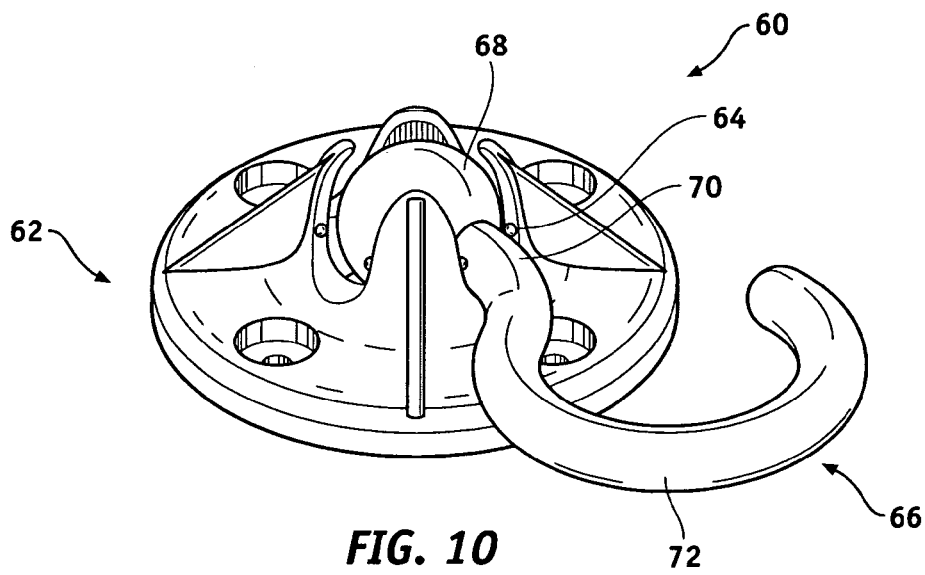

For the exemplary purposes of this disclosure, although there are a variety of support implementations for support assemblies, with reference to FIGS. 10 and 13–17 and for the exemplary purposes of this disclosure, supports 66, 120, 130, 140, 150, and 160 are examples of support implementations. Supports 66, 120, 130, 140, 150, and 160 are similar to support 30 as previously described. The principle differences between them relate to their respective heads, shanks and holders. The heads, shanks and holders may be formed as a single piece with the heads, shanks and holders united together. The shanks and holders each may form a cross-shape in cross section, or they may be solid and form a circular shape in cross-section, such as support 66 with its solid shank 70 and solid holder 72 (FIG. 10). The heads may be recessed, or they may be solid, such as support 66 with its solid head 68 (FIG. 10). Notwithstanding, the heads, shanks and holders may include any combination of the foregoing (e.g. the shank may be solid and cylindrical, the head may be recessed, and the holder may form a cross-shape in cross section). The holders may be one of at least one loop, at least one hook, and a combination thereof. The at least one hook or loop may be one of a single hook or loop (FIGS. 3 and 16), a single angled hook or loop (FIG. 17), a double hook or loop (FIG. 13), a treble hook or loop (FIG. 14), an inline series of hooks or loops (FIG. 15), and a combination thereof.

Figure 11:
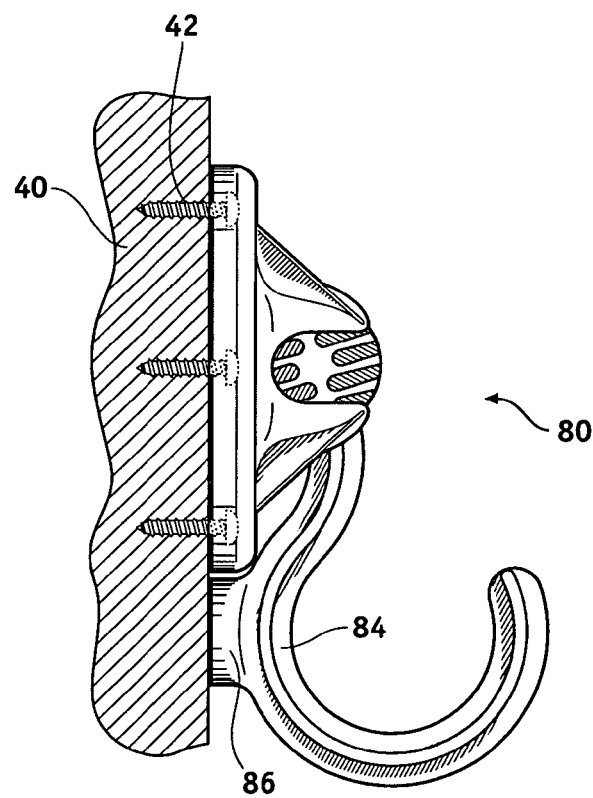
FIG. 11 is a side view of an installed alternative support assembly implementation.

For the exemplary purposes of this disclosure, although there are a variety of support assembly implementations for holding items, with reference to FIG. 11 and for the exemplary purposes of this disclosure, support assembly 80 is an example of a support assembly implementation. Support assembly 80 is substantially similar to support assembly 10 as previously described. The principle difference between them relates to their respective supports. In particular, support 82 includes holder 84 which has winged brace 86 coupled on a back thereof that abuts wall 40 for keeping holder 84 orthogonal to wall 40 or any other mounting surface when support assembly 80 is installed thereon. That is, brace 86 keeps support 82 from spinning when support assembly 80 is installed.

Figure 12:
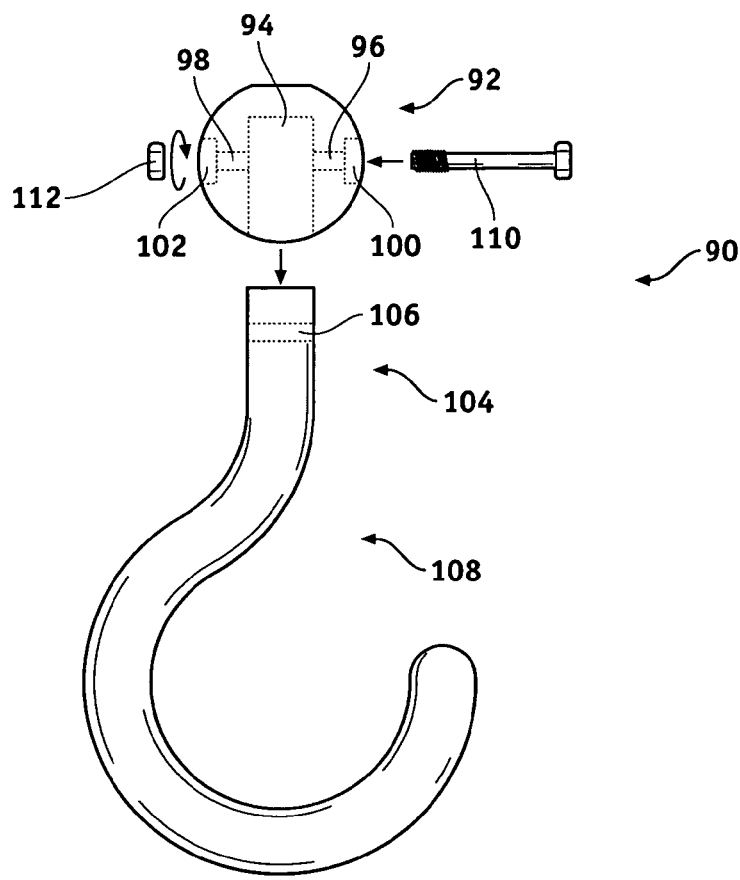
FIGS. 12–17 are views of supports of alternative support implementations.
Figure 13:
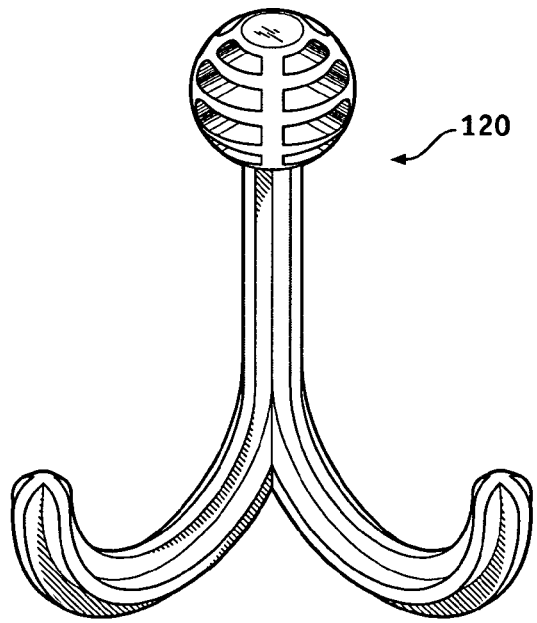
Figure 14:
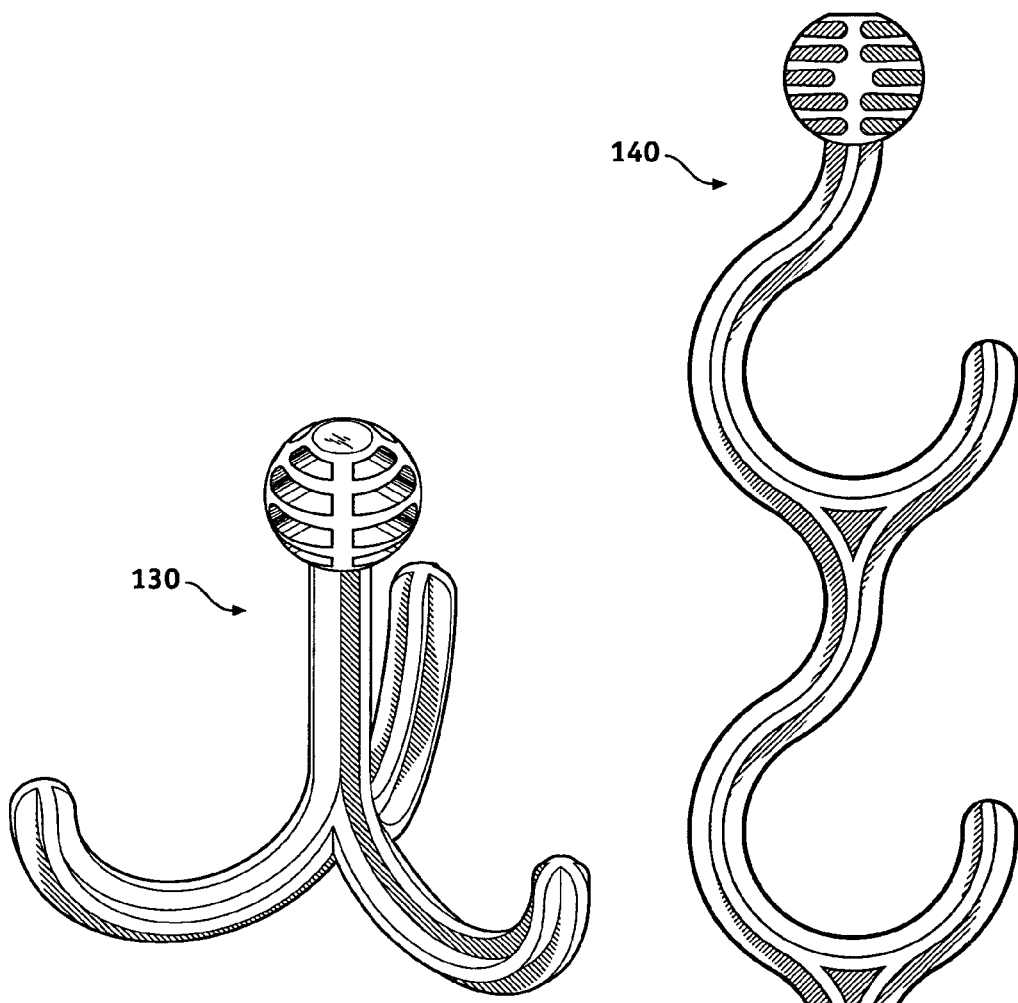
Figure 15:
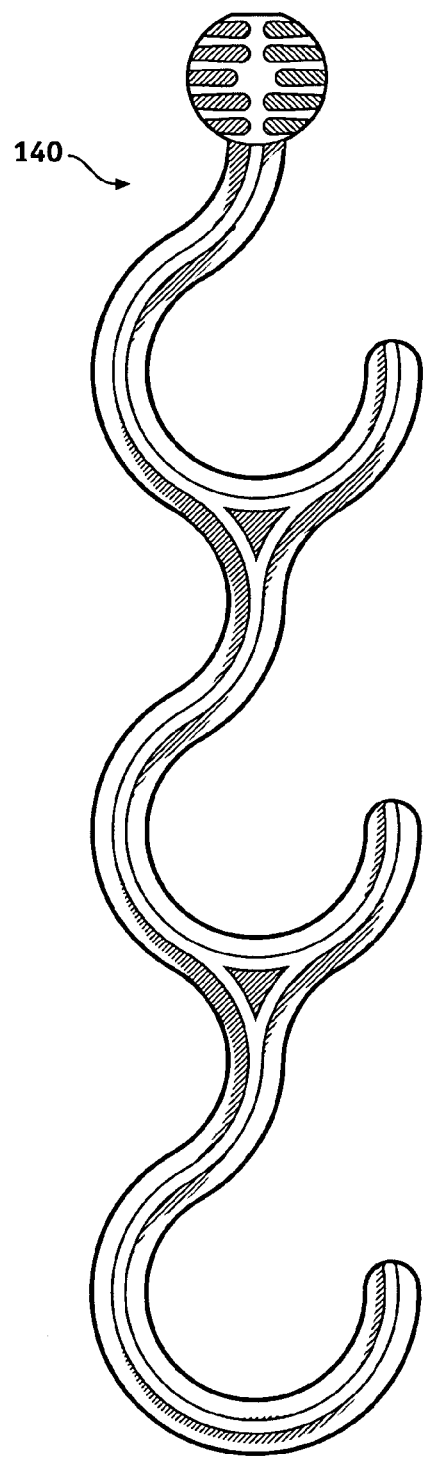
Figure 16:
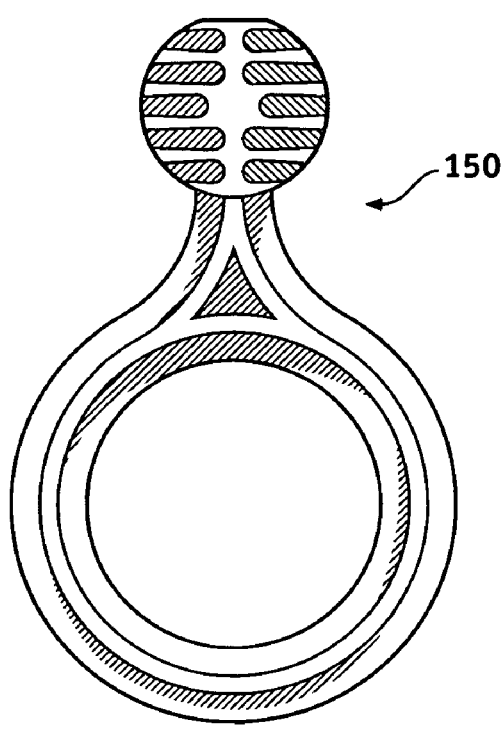
Figure 17:
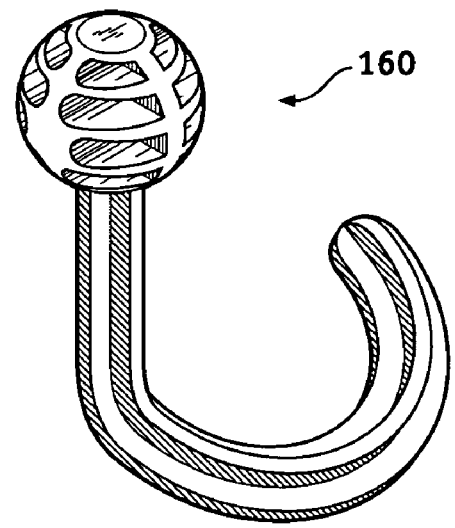

For the exemplary purposes of this disclosure, although there are a variety of support implementations for support assemblies, with reference to FIG. 12 and for the exemplary purposes of this disclosure, support 90 is an example of a support implementation. Support 90 is substantially similar to support 66 as previously described. The principle difference between them is that shank 104 and head 92 may be removably coupled together. Accordingly, a free end of shank 104 may include aligning through hole 106, while the other end may be coupled to holder 108. Head 92 may include shank-receiving hole 94 therein and a pair of aligning through holes 96 and 98 there through orthogonal to and in communication with shank-receiving hole 94, aligning through holes 96 and 98 corresponding to aligning through hole 106 in the free end of shank 104. Any removable fastener, depicted here as bolt 110 for example, may be passed through the aligning through holes to removably couple the free end of the shank within the shank-receiving hole, using nut 112 as depicted for example. Opposing recesses 100 and 102 in communication with aligning through holes 96 and 98 respectively may also be included so that the head of bolt 110 and nut 112 may be flush with the surface of head 92. Having shanks and heads that may be removably coupled together allows a variety of different types of holders to be used without even having to uninstall a support assembly from a structure.

For the exemplary purposes of this disclosure, although there are a variety of support assembly implementations for holding items, with reference to FIGS. 9–10 and for the exemplary purposes of this disclosure, support assembly 60 is an example of a support assembly implementation. Support assembly 60 is substantially similar to support assembly 10 as previously described. The principle differences between them are mounting base 62 and support 66 as previously described. Each socket member 16 of mounting base 62 may include bump or protuberance 64 on each side of socket member 16 protruding into adjacent shank notch 22. Bumps 64 are positioned, sized, and shaped to removably retain cylindrical shank 70 in notches 22 when shank 70 is moved sidewise into notches 22. That is, cylindrical shank 70 may removably snap into notches 22. Alternative mounting bases that may have two or three socket members and two or three shank notches respectively may also include bumps 64. One advantage that this implementation provides is the ability to store support 66 out of the way when not in use.

For the exemplary purposes of this disclosure, although there are a variety of mounting base implementations for support assemblies, with reference to FIG. 8 and for the exemplary purposes of this disclosure, mounting base 50 for removably accommodating a plurality of different and interchangeable supports is an example of a mounting base implementation. Mounting base 50 is substantially similar to mounting base 12 as previously described. The principle difference between them is that mounting base 50 may be formed with radial through gap 52 which provides a restricted lateral passageway extending between the outside edge of the base portion of mounting base 50 and internal head cavity 18. The sides of gap 52 may be substantially parallel or on a slight angle for convenience of manufacture. Gap may be located midway between adjacent socket members 16, in communication with notch 22 separating adjacent socket members 16. Through gap 52 allows a variety of interchangeable supports to be used that would not be able to be used otherwise, such as the alternative supports depicted in FIGS. 13–17 for example. The shanks of the supports depicted in FIGS. 13–17 may have at least one transverse dimension which is smaller than the width of gap 52. As depicted, the shanks and holders are of a similar width, although this is not necessary. To removably couple any of the supports depicted in FIGS. 13–17 for example to mounting base 50, mounting base may be held as shown in FIG. 8 and the support may be held with the head and the shank down and the holder up. The shank is then positioned adjacent the outside edge of the base portion of mounting base 50 so that it is aligned with gap 52. Thereupon the shank is passed through gap 52 so that the head is supported in internal head cavity 18. Alternative mounting bases may also include gap 52.

For the exemplary purposes of this disclosure, there are a variety of kit implementations for holding items. Kit implementations may include one or more mounting bases as described previously and a plurality of interchangeable supports as described previously for removably coupling to the at least one mounting base. Kit implementations may be in the form of storage racks.

Further implementations are within the CLAIMS.

4. Use

Support assembly implementations are particularly useful in residential garage storage applications to hold rope, electrical cords, power tools, hand tools, lawn and garden tools, bags, bicycles, and any other item that one desires to suspend out of the way in a convenient place. They can be installed on virtually any surface in the garage, such as the ceiling, a wall, under a workbench, the floor, and a door for example. However, support assembly implementations are not limited to uses relating to residential garage storage applications and the like. Support assembly implementations may also be used in a variety of applications with similar results, such as home, kitchen, and office storage applications, industrial storage and tie down applications, automotive storage and tie down applications, marine storage and tie down applications, restaurant storage applications, and the like.

What is claimed is:

1. A support assembly comprising:
   a mounting base comprising:
      a socket comprising at least two socket members at least partially forming an internal head cavity;
      a through hole extending through the mounting base and the socket, the through hole in communication with the head cavity, and the through hole comprising at least two shank notches between and separating the at least two socket members;
   a support removably coupled to the mounting base; and
   a lateral through gap extending between an outside edge of the mounting base and the internal head cavity for allowing the use of a variety of supports.

2. The support assembly of claim 1, wherein the mounting base has at least one fastener through hole disposed adjacent the socket.

3. The support assembly of claim 1, wherein the at least two socket members are curved inwardly at least partially forming the internal head cavity, wherein the internal head cavity is partially spherical.

4. The support assembly of claim 1, wherein each of the at least two socket members comprises a bump on each side of the socket member protruding into an adjacent shank notch.

5. The support assembly of claim 1, wherein the mounting base further comprises at least two braces coupled between external surfaces of the at least two socket members and the mounting base.

6. The support assembly of claim 1, wherein the support comprises:
   a head removably pivotably supported in the head cavity;
   a shank coupled to the head and moveable into the at least two shank notches; and
   at least one holder coupled to the shank.

7. The support assembly of claim 6, wherein the at least one holder is one of at least one loop, at least one hook, and a combination thereof.

8. The support assembly of claim 7, wherein the at least one hook is one of a single hook, a single angled hook, a double hook, a treble hook, and an inline series of hooks, and wherein the at least one loop is one of a single loop, a single angled loop, a double loop, a treble loop, and an inline series of loops.

9. The support assembly of claim 6, wherein the at least one holder has a brace coupled on a back thereof for keeping the at least one holder orthogonal to a mounting surface when the support assembly is installed thereon.

10. The support assembly of claim 6, wherein the shank and the head are removably coupled together.

11. The support assembly of claim 10, wherein a free end of the shank comprises an aligning through hole, wherein the head comprises a shank-receiving hole therein and a pair of aligning through holes there through orthogonal to and in communication with the shank-receiving hole, the pair of aligning through holes corresponding to the aligning through hole in the free end of the shank, and wherein a removable fastener is passed through the aligning through holes to removably couple the free end of the shank within the shank-receiving hole.

12. The support assembly of claim 6, wherein the head comprises a plurality of recesses therein, and wherein the shank and the at least one holder each forms a cross-shape in cross section.

13. A support assembly comprising:
   a mounting base comprising:
      a protruding socket comprising four inwardly curved socket members each having a free end, the socket members at least partially forming a partially spherical internal head cavity;
      a through hole extending coaxially through the mounting base and the socket, the through hole in communication with the head cavity, and the through hole comprising four shank notches between and separating the socket members;
   a support removably coupled to the mounting base, the support comprising:
      a ball-shaped head removably pivotably supported in the internal head cavity;
      a shank coupled to the ball-shaped head and moveable into the shank notches;

a lateral through gap extending between an outside edge of the mounting base and the internal head cavity for allowing the use of a variety of supports; and at least one holder coupled to the shank.

14. The support assembly of claim 13, wherein the mounting base has four fastener through holes disposed adjacent the socket.

15. The support assembly of claim 13, wherein each of the socket members comprises a bump on each side of the socket member protruding into an adjacent shank notch.

16. The support assembly of claim 13, wherein the mounting base further comprises four braces coupled between external surfaces of the socket members and the mounting base.

17. The support assembly of claim 13, wherein the at least one holder is one of at least one loop, at least one hook, and a combination thereof.

18. The support assembly of claim 17, wherein the at least one hook is one of a single hook, a single angled hook, a double hook, a treble hook, and an inline series of hooks, and wherein the at least one loop is one of a single loop, a single angled loop, a double loop, a treble loop, and an inline series of loops.

19. The support assembly of claim 13, wherein the at least one holder has a brace coupled on a back thereof for keeping the at least one holder orthogonal to a mounting surface when the support assembly is installed thereon.

20. The support assembly of claim 13, wherein the shank and the ball-shaped head are removably coupled together.

21. The support assembly of claim 20, wherein a free end of the shank comprises an aligning through hole, wherein the head comprises a shank-receiving hole therein and a pair of aligning through holes there through orthogonal to and in communication with the shank-receiving hole, the pair of aligning through holes corresponding to the aligning through hole in the free end of the shank, and wherein a removable fastener is passed through the aligning through holes to removably couple the free end of the shank within the shank-receiving hole.

22. The support assembly of claim 13, wherein the ball-shaped head comprises a plurality of recesses therein, and wherein the shank and the at least one holder each forms a cross-shape in cross section.

23. A support assembly comprising:
a mounting base comprising:
a protruding socket comprising a circumferentially undulating edge at least partially forming a partially spherical internal head cavity;
a through hole extending through the mounting base and the socket, the through hole in communication with the internal head cavity;
a support removably coupled to the mounting base; and
a lateral through cap extending between an outside edge of the mounting base and the internal head cavity for allowing the use of a variety of supports.

24. A kit comprising:
at least one mounting base comprising:
a socket comprising at least two socket members at least partially forming an internal head cavity; and
a through hole extending through the mounting base and the socket, the through hole in communication with the head cavity, and the through hole comprising at least two shank notches between and separating the at least two socket members; and
a plurality of interchangeable supports for removably coupling to the at least one mounting base; and
a lateral through gap extending between an outside edge of the at least one mounting base and the internal head cavity for allowing the use of a variety of supports.

25. The support assembly of claim 24, wherein each of the at least two socket members comprises a bump on each side of the socket member protruding into an adjacent shank notch.

26. The support assembly of claim 24, wherein each support comprises:
a head for being removably pivotably supported in the head cavity;
a shank coupled to the head and configured for being moveable into the at least two shank notches; and
at least one holder coupled to the shank.

27. The support assembly of claim 26, wherein the at least one holder is one of at least one loop, at least one hook, and a combination thereof.

28. The support assembly of claim 27, wherein the at least one hook is one of a single hook, a single angled hook, a double hook, a treble hook, and an inline series of hooks, and wherein the at least one loop is one of a single loop, a single angled loop, a double loop, a treble loop, and an inline series of loops.

29. The support assembly of claim 26, wherein the shank and the head are removably coupled together.

30. The support assembly of claim 29, wherein a free end of the shank comprises an aligning through hole, wherein the head comprises a shank-receiving hole therein and a pair of aligning through holes there through orthogonal to and in communication with the shank-receiving hole, the pair of aligning through holes corresponding to the aligning through hole in the free end of the shank, and wherein a removable fastener is passed through the aligning through holes to removably couple the free end of the shank within the shank-receiving hole.

* * * * *